US008416120B2

(12) United States Patent
Kim et al.

(10) Patent No.: US 8,416,120 B2
(45) Date of Patent: Apr. 9, 2013

(54) METHOD OF SENSOR NETWORK LOCALIZATION THROUGH RECONSTRUCTION OF RADIATION PATTERN

(75) Inventors: Jong Tae Kim, Gunpo-si (KR); Chae Seok Lim, Suncheon-si (KR)

(73) Assignee: Sungkyunkwan University Foundation for Corporate Collaboration, Suwon (KR)

( * ) Notice: Subject to any disclaimer, the term of this patent is extended or adjusted under 35 U.S.C. 154(b) by 502 days.

(21) Appl. No.: 12/372,044

(22) Filed: Feb. 17, 2009

(65) Prior Publication Data

US 2010/0085242 A1 Apr. 8, 2010

(30) Foreign Application Priority Data

Oct. 7, 2008 (KR) .................. 10-2008-0098307

(51) Int. Cl.
*G01S 13/06* (2006.01)
*G01S 3/04* (2006.01)
*G01S 13/00* (2006.01)

(52) U.S. Cl.
USPC ............. 342/59; 342/118; 342/126; 342/145; 342/146; 342/147; 342/175; 342/195; 342/450; 342/451; 342/463

(58) Field of Classification Search .................. 342/21, 342/22, 27, 28, 59, 118, 134–145, 175, 195, 342/450–465, 165, 169–174, 126; 340/531, 340/539.1, 539.22–539.26, 870.01, 870.02, 340/870.03, 870.11, 870.18; 367/118, 129; 701/1, 117; 709/223; 702/1, 33, 35, 36; 455/403, 422.1, 456.1, 456.3; 370/254, 310, 370/328, 338
See application file for complete search history.

(56) References Cited

U.S. PATENT DOCUMENTS

| | | | | |
|---|---|---|---|---|
| 4,614,945 A * | 9/1986 | Brunius et al. | ........... | 340/870.03 |
| 5,438,329 A * | 8/1995 | Gastouniotis et al. | ... | 340/870.02 |
| 5,481,259 A * | 1/1996 | Bane | ......................... | 340/870.03 |
| 5,659,303 A * | 8/1997 | Adair, Jr. | ................. | 340/870.18 |
| 5,945,948 A * | 8/1999 | Buford et al. | ................. | 342/457 |
| 6,266,534 B1 * | 7/2001 | Raith et al. | ................. | 455/456.3 |
| 7,119,676 B1 * | 10/2006 | Silverstrim et al. | ........... | 340/531 |
| 7,123,925 B2 * | 10/2006 | Robinson et al. | ........... | 455/456.1 |
| 7,283,904 B2 * | 10/2007 | Benjamin et al. | ............. | 701/117 |
| 7,289,466 B2 * | 10/2007 | Kore et al. | ..................... | 370/328 |
| 7,298,327 B2 * | 11/2007 | Dupray et al. | ................ | 342/451 |
| 7,372,773 B2 * | 5/2008 | Horak | ........................... | 367/129 |
| 7,457,860 B2 * | 11/2008 | Shang et al. | ................. | 709/223 |
| 7,525,484 B2 * | 4/2009 | Dupray et al. | ................ | 342/450 |
| 7,607,351 B2 * | 10/2009 | Allison et al. | .................. | 702/36 |
| 7,693,663 B2 * | 4/2010 | Friedlander et al. | ............ | 702/15 |
| 7,697,458 B2 * | 4/2010 | Park et al. | ...................... | 370/254 |
| 7,710,265 B2 * | 5/2010 | Voglewede et al. | ...... | 340/539.26 |
| 7,825,791 B2 * | 11/2010 | Kim et al. | ................. | 340/539.26 |

(Continued)

*Primary Examiner* — Bernarr Gregory
(74) *Attorney, Agent, or Firm* — Lexyoume IP Meister, PLLC.

(57) ABSTRACT

Disclosed herein is a method of sensor network localization through reconstruction of a radiation pattern with a characteristic value of an antenna depending on orientation thereof. The method can minimize errors using an antenna characteristic value and a signal strength depending on the orientation. In addition, the method can minimize errors using an artificial neural network to characterize a distorted radiation pattern of an antenna and using it for the localization of a triangulation method. Furthermore, the method can increases the localization rate even in a passive localization method by characterizing an asymmetric antenna radiation pattern and constructing the antenna characteristic through an artificial neural network.

9 Claims, 6 Drawing Sheets

U.S. PATENT DOCUMENTS

| | | |
|---|---|---|
| 2001/0022558 A1 | 9/2001 | Dupray |
| 2003/0146871 A1 | 8/2003 | Dupray |
| 2003/0222820 A1 | 12/2003 | Dupray |
| 2006/0039300 A1* | 2/2006 | Ogier et al. .................... 370/254 |
| 2008/0031213 A1* | 2/2008 | Kaiser et al. ................... 370/338 |
| 2008/0137624 A1* | 6/2008 | Silverstrim et al. ........... 370/338 |

* cited by examiner (a)  (b)

METHOD OF SENSOR NETWORK LOCALIZATION THROUGH RECONSTRUCTION OF RADIATION PATTERN

CROSS-REFERENCE TO RELATED APPLICATION

This application claims priority to and the benefit of Korean Patent Application No. 10-2008-0098307 filed in the Korean Intellectual Property Office on Oct. 7, 2008, the entire contents of which are incorporated herein by reference.

BACKGROUND OF THE INVENTION

1. Field of the Invention

The present invention relates to a method of sensor network localization and, more particularly, to a method of sensor network localization through reconstruction of a radiation pattern with a characteristic value of an antenna depending on orientation thereof.

2. Description of the Related Art

A wireless sensor network is composed of interconnected sensor nodes which are small computing devices for wireless communication. The wireless sensor network has been increasingly applied to military applications, traffic automation, and location based services as well as traditional technical fields such as environmental information monitoring or data collection. The wireless sensor network is suitable for efficiently collecting distributed data from remote nodes and providing customized services.

For a location based service, user location information is important in a sensor network. Accordingly, a number of algorithms have been proposed to estimate the location information. Such localization algorithms can be divided into an active localization scheme and a passive localization scheme depending on how signals related to localization are produced.

The active localization scheme refers to a technique in which devices involved in a system, a network infrastructure or a network can produce signals required for localization and estimate the location with the signals. Most reliable systems, such as radar or sonar systems, which estimate location using wave reflection, and global positioning systems (GPS), which use signals transmitted from satellites to the earth, are based on the active localization technique. However, drawbacks of the active localization technique include relatively expensive components or devices and high power consumption compared with the passive localization technique.

On the other hand, the passive localization scheme is a technique of estimating locations without information produced for the purpose of localization. The passive localization technique generally uses time difference of arrival (TDOA), angle of arrival (AOA) or received signal strength (RSS) of a sound or an electric wave of a localization target. The passive localization technique requires less cost but provides a lower quality than the active localization technique. For a wireless sensor network, however, since a number of sensor nodes are distributed in a wide area, network expansion should be considered to provide a localization system. Moreover, since the localization system requires efficient operation in a limited environment, the active localization technique is not appropriate for the sensor network environment in terms of efficiency. Hence, research into localization with the passive localization technique has been actively conducted in the fields related to the wireless sensor network. Above all, research into systems using the RSS scheme are most actively carried out, since the systems require no additional equipment and infrastructure and thus are suitable for a sensor network environment with limited resources.

For the RSS scheme, however, it is not easy to obtain distance information from a signal due to reflection, attenuation or diffusion of the signal. Furthermore, for the RSS scheme, RSS fluctuation occurs with time due to signal interference, thereby causing localization errors.

SUMMARY OF THE INVENTION

The present invention is conceived to solve the problems of the conventional techniques as described above, and an aspect of the present invention is to provide a method of sensor network localization with a reconstructed radiation pattern which can minimize errors.

According to an aspect of the present invention, there is provided a method of sensor network localization through reconstruction of a radiation pattern, in which the sensor network includes a plurality of sensor nodes and a gateway communicating with each other through an antenna. The method includes measuring a radiation characteristic value of the antenna; measuring radiation patterns of first and second sensor nodes of the plurality of sensor nodes; and measuring a position of a third sensor node using the radiation characteristic value of the antenna and the radiation patterns of the first and second sensor nodes.

The measuring a radiation characteristic value of the antenna may include: measuring a radiation characteristic value according to an angle of the antenna; and deriving a radiation characteristic value of the antenna over a full range of direction using learning and reasoning functionalities of an artificial neural network based on the radiation characteristic value according to the angle of the antenna.

The measuring a radiation characteristic value according to an angle of the antenna may include: arranging the plurality of sensor nodes in a radial pattern at a constant distance from the gateway; comparing a signal strength transmitted from the gateway with an actual signal strength received by each of the plural sensor nodes; and comparing a signal strength transmitted from each of the plural sensor nodes with an actual signal strength received by the gateway.

The method may further include: converting, by each of the sensor nodes, the actually transmitted or received signal strength into a signal strength in dBm; and determining an antenna characteristic value from the signal strength in dBm using a signal attenuation equation:

$$RxPower_{n2} = \frac{TxPower_{n1}}{1 + distance_{n1-n2}^{\beta}},$$

where $RxPower_{n2}$ indicates a signal strength of the first sensor node which is actually received by the second sensor node, $TxPower_{n1}$ indicates a signal strength transmitted from the first sensor node, and $distance_{n1-n2}$ indicates a distance of the second sensor node which is calculated at the first sensor node.

The deriving a radiation characteristic value of the antenna over a full range of direction using learning and reasoning functionalities of an artificial neural network based on the radiation characteristic value according to an angle of the antenna may include deriving the antenna characteristic value over a full range of direction using an artificial neural network comprising an input node, a hidden node and an output node, and wherein the artificial neural network receives the angle of the antenna at the input node and returns the antenna characteristic value according to the angle of the antenna at the output node.

The measuring radiation patterns of first and second sensor nodes of the plurality of sensor nodes may include: measuring positions and angles of the first and second sensor nodes and a distance between the first and second sensor nodes; generating a first data pair by comparing a signal strength transmitted from the first sensor node with an actual signal strength received by the second sensor node; and generating a second data pair by comparing a signal strength transmitted from the second sensor node with an actual signal strength received by the first sensor node.

The measuring a position of a third sensor node using the radiation characteristic value of the antenna and the radiation patterns of the first and second sensor nodes may include: deriving an expected position of the third sensor node from the radiation characteristic value of the antenna, the first data pair and the second data pair; and determining an actual position of the third sensor node using an antenna characteristic value according to the expected position of the third sensor node, the artificial neural network and triangulation.

The determining an actual position of the third sensor node using an antenna characteristic value according to the expected position of the third sensor node, the artificial neural network and the triangulation may include: forming a first triangle from the first sensor node, the second sensor node, and an expected position of the third sensor node according to the first sensor node; forming a second triangle from the first sensor node, the second sensor node, and an expected position of the third sensor node according to the second sensor node; deriving a first antenna characteristic value of the third sensor node with respect to the first sensor node using triangulation of the first triangle and the second triangle; deriving a second antenna characteristic value of the third sensor node with respect to the second sensor node using triangulation of the first triangle and the second triangle; and determining, as a position of the third sensor node, an expected position of the third sensor node satisfying an artificial neural network module among expected positions of the third sensor node, wherein the artificial neural network module is FindBetaFromAngle($\theta_{init}$)=$\beta_{n-1}$ FindBetaFromAngle($\theta_{init}+\theta_n$)=$\beta_{n-2}$, where $\beta_{n-1}$ indicates the first antenna characteristic value, $\beta_{n-2}$ indicates the second antenna characteristic value, $\theta_n$ indicates an angle formed by both a side between the third sensor node and an expected position of the third sensor node according to the second sensor node and a side between the third sensor node and an antenna direction of the third sensor node, and $\theta_{init}$ indicates an angle formed by both a side between the third sensor node and an expected position of the third sensor node according to the first sensor node and a side between the third sensor node and an antenna direction of the third sensor node.

The third sensor node may be located within a signal transmission range of the first and second sensor nodes.

BRIEF DESCRIPTION OF THE DRAWINGS

The above and other aspects, features and advantages of the present invention will become apparent from the following description of exemplary embodiments given in conjunction with the accompanying drawings, in which.

DETAILED DESCRIPTION OF THE EMBODIMENT

Figure 1:
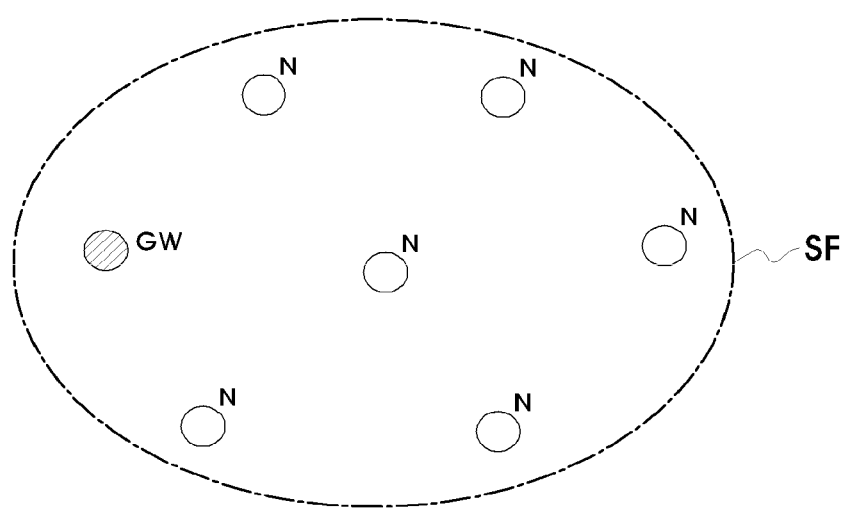
FIG. 1 is a diagram of a sensor network according to an exemplary embodiment of the present invention.

Hereinafter, exemplary embodiments of the present invention will be described in detail with reference to the accompanying drawings.

However, the present invention is not limited to the exemplary embodiments described below and various modifications and equivalent embodiments can be made. The embodiments are given by way of illustration only and to fully explain the spirit and scope of the present invention to those skilled in the art. Like reference numerals denote like elements through the drawings.

Referring to FIG. 1, which schematically illustrates a sensor network according to an exemplary embodiment of the present invention, the sensor network according to the embodiment of the invention includes a plurality of sensor nodes N and a gateway GW communicating with the sensor nodes N within a sensor field SF. The sensor network may further include sink nodes to connect the sensor nodes to the gateway. The sensor network has the plural sensor nodes N distributed within a data collecting region, i.e. a sensor field SF. The sensor nodes N collect and transmit information to the gateway GW, and the gateway GW then provides the information to users. The gateway may transmit the information to the users via the Internet, for example. It should be noted that the information may be transmitted from the sensor nodes to the gateway through sink nodes, if further provided. Furthermore, the sensor network may select a cluster head CH satisfying some requirements among the sensor nodes so that the cluster head can transmit the information from the sensor nodes to the gateway. In this case, the selected cluster head collects information from neighboring sensor nodes and transmits it to the gateway, and the gateway then provides the information to users.

The sensor nodes N are fundamental elements of the sensor network to observe physical phenomena within the sensor field SF and transmit information on the phenomena. Each of the sensor nodes includes an antenna and a driver circuit for the antenna in order to communicate with other sensor nodes and a gateway GW.

The gateway GW transmits information from the sensor nodes N to the users. The gateway GW may transmit the information to the users via the Internet, for example.

Next, a method of sensor network localization according to an exemplary embodiment of the invention will be described below with reference to the drawings.

Figure 2:
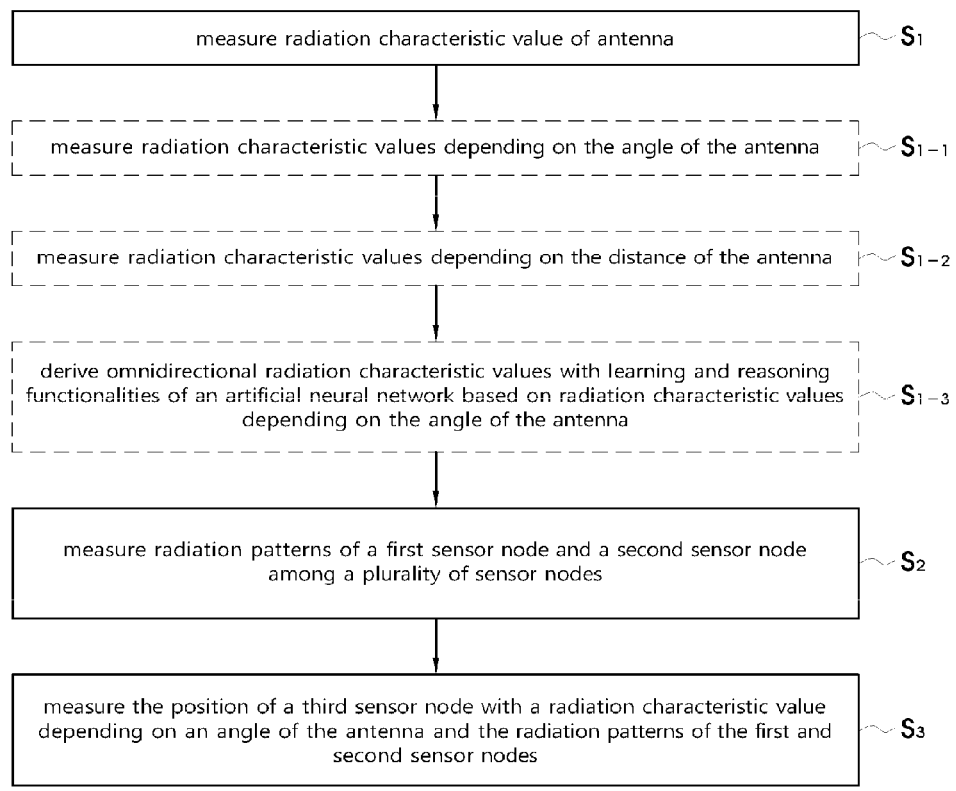
FIG. 2 is a flowchart of a method of sensor network localization according to an exemplary embodiment of the present invention.
Figure 3:
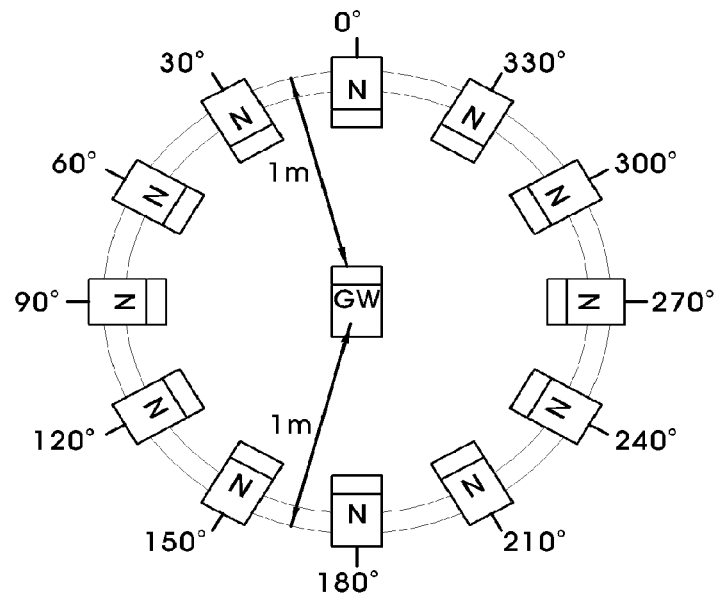
FIG. 3 shows an arrangement of a gateway and sensor nodes for measuring a radiation characteristic value depending on an antenna angle of a sensor network according to an exemplary embodiment of the present invention.
Figure 4:
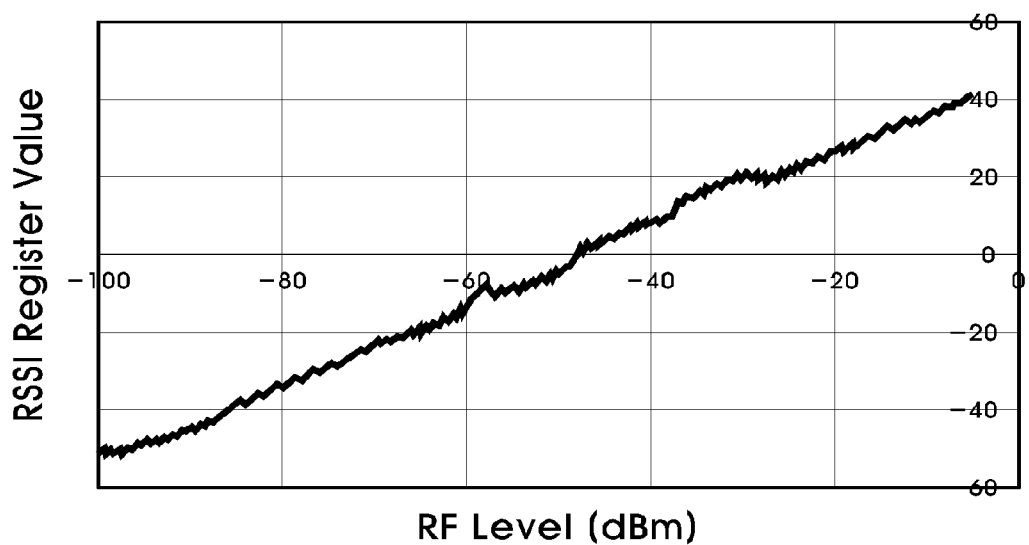
FIG. 4 is a graph of a data transmission/reception register value with respect to a received signal strength of each sensor node in a sensor network according to an exemplary embodiment of the present invention.
Figure 5:
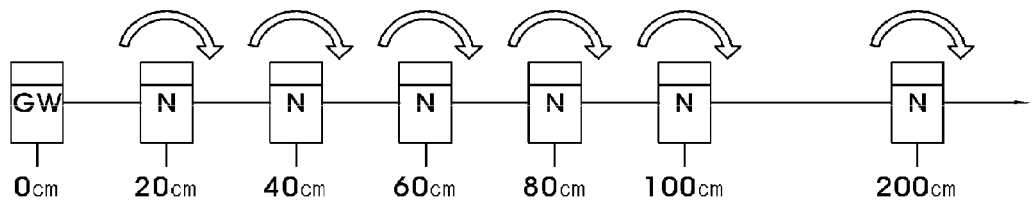
FIG. 5 shows an arrangement of a gateway and sensor nodes for measuring a radiation characteristic value depending on an antenna distance of a sensor network according to an exemplary embodiment of the present invention.
Figure 6:
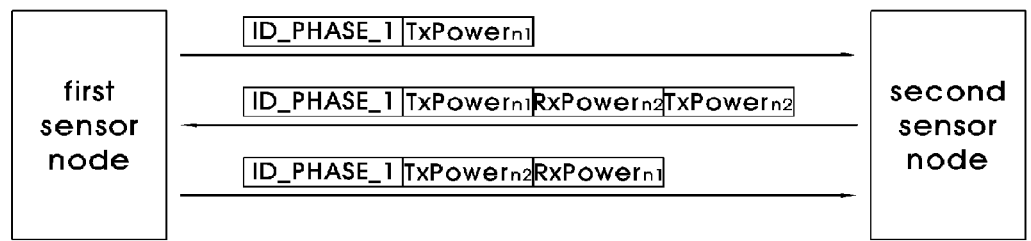
FIG. 6 is a diagram of data communication in a sensor network according to an exemplary embodiment of the present invention.
Figure 7:
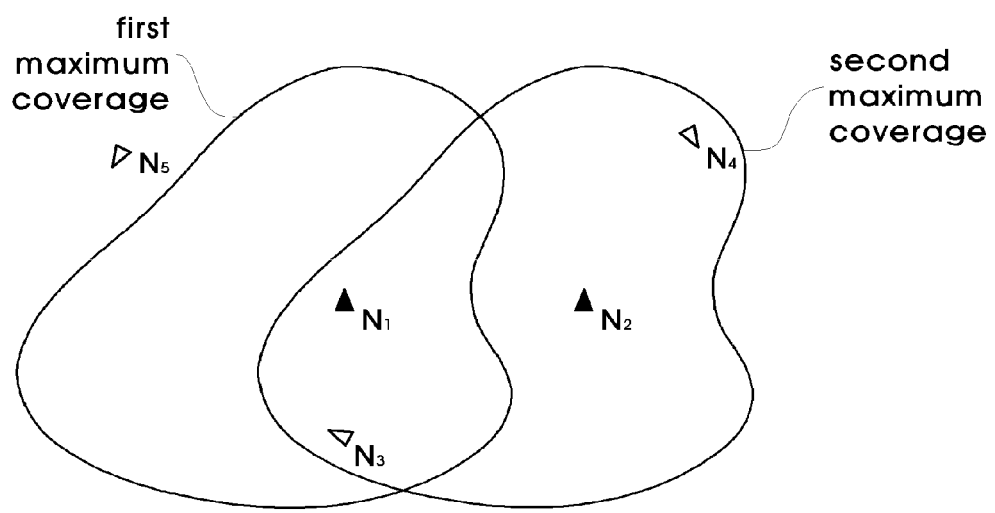
FIG. 7 is a diagram of communication coverage of a sensor network according to an exemplary embodiment of the present invention.
Figure 8:
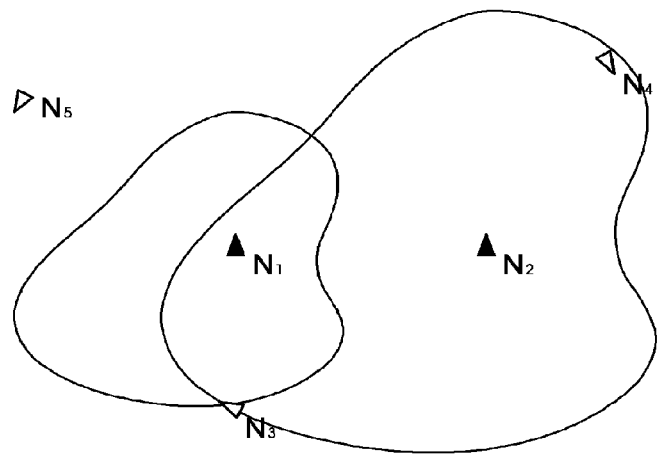
FIGS. 8 to 10 are diagrams of the method of sensor network localization according to the exemplary embodiment of the present invention.
Figure 9:
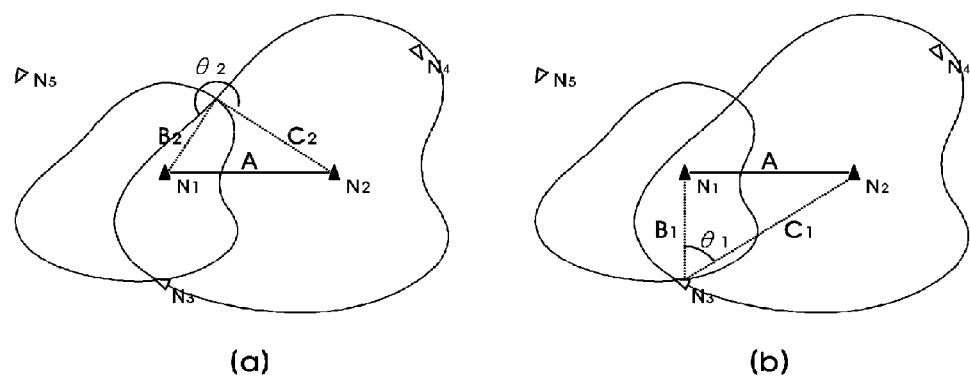
Figure 10:
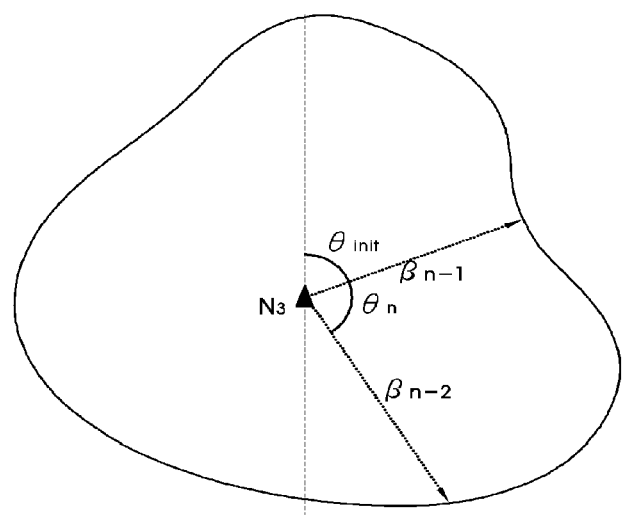

FIG. 2 is a flowchart of a method of sensor network localization according to an exemplary embodiment of the invention. FIG. 3 shows an arrangement of a gateway and sensor nodes for measuring a radiation characteristic value depending on an antenna angle of a sensor network according to an exemplary embodiment of the present invention. FIG. 4 is a graph of a data transmission/reception register value with respect to a received signal strength of each sensor node in a sensor network according to an exemplary embodiment of the present invention. FIG. 5 shows an arrangement of a gateway and sensor nodes for measuring a radiation characteristic value depending on an antenna distance of a sensor network according to an exemplary embodiment of the present invention. FIG. 6 is a diagram of data communication in a sensor network according to an exemplary embodiment of the present invention. FIG. 7 is a diagram of communication coverage of a sensor network according to an exemplary embodiment of the present invention. FIGS. 8 to 10 are diagrams of the method of sensor network localization according to the exemplary embodiment of the present invention.

Referring to FIG. 2, the method according to the embodiment of the invention includes measuring a radiation characteristic value of an antenna at operation S1, measuring radiation patterns of a first sensor node $N_1$ and a second sensor node $N_2$ among a plurality of sensor nodes at operation S2, and measuring the position of a third sensor node $N_3$ with a radiation characteristic value depending on an angle of the antenna and the radiation patterns of the first and second sensor nodes $N_1$ and $N_2$ at operation S3.

At operation S1, in order to sample basic data for determining the characteristics of the antenna, sensor nodes are placed in predetermined angles at the same distance from the gateway to measure radiation characteristic values. Operation S1 includes measuring radiation characteristic values depending on the angle of the antenna at operation S1-1, measuring radiation characteristic values depending on the distance of the antenna at operation S1-2, and deriving omnidirectional radiation characteristic values with learning and reasoning functionalities of an artificial neural network based on radiation characteristic values depending on the angle of the antenna at operation S1-3.

Referring to FIG. 3, at operation S1-1, basic data sampling is performed by arranging 12 sensor nodes N at regular angular intervals around the gateway GW at a predetermined distance, for example, one meter away from the gateway GW. Then, the gateway GW sequentially attempts to establish data communication with each of the 12 sensor nodes N. The data from the gateway records the strength of a signal produced by the gateway GW. Each of the sensor nodes N receives the data and adds the signal strength of the gateway GW, which is received by each of the sensor nodes N, to the end of the data packet which is received by each of the sensor nodes N. Since the transmission/reception sensitivity of an antenna depends on its orientation, the transmission characteristic of the gateway antenna can be determined from data received by sensor nodes with the same angle at every orientation. In a similar manner, when the gateway GW receives signals, each having the same strength, from the sensor nodes, it is possible to determine the reception characteristic of the gateway antenna. In other words, even in the case where the 12 sensor nodes each transmit signals with the same strength, the gateway antenna receives signals with different strengths depending on its direction. Therefore, the reception characteristic of the gateway antenna can be determined by collecting the signals with different strengths.

Furthermore, the strengths of the signals received from the gateway GW and the sensor nodes N are expressed numerically. The numerical data may be divided into a data pair which are transmitted from the gateway GW to the sensor nodes N and a data pair which are transmitted from the sensor nodes N to the gateway GW. For example, the data pair obtained based on the received signal strength are represented by a 8-bit register in the case of CC2420 which is a wireless communication integrated circuit.

The data pair obtained from the test above are slightly different from the signal strength actually received by each of the sensor nodes N. The relation between the register values and the signal strengths actually received by the sensor nodes is shown in FIG. 4. Furthermore, the relation between the data pair obtained from the test and the signal strengths actually received by the respective sensor nodes N is expressed by Equation 1.

$P32$ RSS_VALUE+RSSI_OFFSET (where, RSSI_OFFSET=−45)         Equation 1

The signal strength actually transmitted and received by the respective sensor nodes N are expressed in units of dBm. An antenna characteristic value, constant β, which is defined by the network characteristic, is obtained from Equation 2, which is a signal attenuation equation.

$$RxPower_{n2} = \frac{TxPower_{n1}}{1 + distance_{n1-n2}^{\beta}} \quad \text{Equation 2}$$

Table 1 shows test results of the gateway based on the orientation. Table 2 shows test results of the sensor node based on the orientation. The respective received signal strengths (hereinafter, RSS) received by the gateway and the sensor nodes are average strengths obtained after performing packet communication 500 times. The values in mW are multiplied by e+10, for convenience.

TABLE 1

|  | Reference angle | | | | | |
|---|---|---|---|---|---|---|
|  | 0° | 30° | 60° | 90° | 120° | 150° |
| RSS | −35 | −35 | −41 | −47 | −39 | −35 |
| Log Scale | −80 | −80 | −86 | −92 | −84 | −80 |
| e + 10 Scaled | 100 | 100 | 25.119 | 6.31 | 39.811 | 100 |
| β | 4 | 4 | 4.3 | 4.6 | 4.2 | 4 |

|  | Reference angle | | | | | |
|---|---|---|---|---|---|---|
|  | 180° | 210° | 240° | 270° | 300° | 360° |
| RSS | −40 | −34 | −31 | −33 | −36.5 | −37.5 |
| Log Scale | −85 | −79 | −76 | −78 | −81.5 | −82.5 |
| e + 10 Scaled | 31.623 | 125.893 | 251.189 | 158.489 | 70.795 | 56.234 |
| β | 4.250 | 3.95 | 3.8 | 3.9 | 4.075 | 4.125 |

TABLE 2

|  | Reference angle | | | | | |
|---|---|---|---|---|---|---|
|  | 0° | 30° | 60° | 90° | 120° | 150° |
| RSS | −33 | −33 | −37 | −44 | −36 | −33 |
| Log Scale | −78 | −78 | −82 | −89 | −81 | −78 |
| e + 10 Scaled | 158.489 | 158.489 | 63.096 | 12.589 | 79.433 | 158.489 |
| β | 3.9 | 3.9 | 4.1 | 4.45 | 4.05 | 3.9 |

|  | Reference angle | | | | | |
|---|---|---|---|---|---|---|
|  | 180° | 210° | 240° | 270° | 300° | 360° |
| RSS | −37 | −31 | −28 | −30 | −34 | −35 |
| Log Scale | −82 | −76 | −73 | −75 | −79 | −80 |
| e + 10 Scaled | 63.096 | 251.189 | 501.187 | 316.228 | 125.893 | 100.00 |
| β | 4.1 | 3.8 | 3.65 | 3.75 | 3.95 | 4 |

Referring to Tables 1 and 2, although corresponding values are not exactly the same, it can be seen that B values calculated in transmission and reception characteristic tests are similar to each other and fluctuate depending on orientation.

At operation S1-2, changes in the antenna characteristic β depending on the varying distances are measured.

Referring to FIG. 5, a predetermined numbers of, for example, six, sensor nodes N are arranged in line at intervals of 0.2, 0.4, 0.6, 0.8, 1 and 2 meters from the gateway GW. Then, the antenna characteristic value β is measured at each of the six sensor nodes N while rotating each of the sensor nodes N in 90° units with respect to the gateway GW.

Table 3 shows RSS values depending on the angle and distance between the gateway GW and the sensor nodes N. Table 4 shows the average and variance of the antenna characteristic values depending on the angle and distance between the gateway GW and the sensor nodes N. Tables 3 and 4 show test results measured 4 times at each of the sensor nodes N while rotating each of the sensor nodes N in 90° units with respect to the gateway GW. Further, the data transmission was repeated 500 times for each test, and the average of the transmitted values was recorded. The antenna characteristic value β is expressed in mW, which is converted from the reception sensitivity in dBm, and can be obtained from Equation 3 below.

$$\beta = \frac{\log(TxPower_{n1} - RxPower_{n2}) - \log RxPower_{n2}}{\log \text{distance}} \quad \text{Equation 3}$$

TABLE 3

(unit: mW)

| Distance (m) | Angle | | | |
|---|---|---|---|---|
| | 0° | 90° | 180° | 270° |
| 0.2 | 39810.72 | 158489.32 | 158489.32 | 19952.62 |
| 0.4 | 1584.89 | 10000.00 | 10000.00 | 794.33 |
| 0.6 | 630.96 | 1584.89 | 1584.89 | 158.49 |
| 0.8 | 199.53 | 398.11 | 398.11 | 79.43 |
| 1 | 63.10 | 158.49 | 125.89 | 25.12 |
| 2 | 12.59 | 7.94 | 7.94 | 3.98 |

TABLE 4

| Distance (m) | Angle | | | |
|---|---|---|---|---|
| | 0° | 90° | 180° | 270° |
| 0.2 | 4.151 | 3.689 | 3.689 | 4.381 |
| 0.4 | 4.245 | 3.745 | 3.745 | 4.432 |
| 0.6 | 4.049 | 3.824 | 3.824 | 4.387 |
| 0.8 | 4.046 | 3.888 | 3.888 | 4.256 |
| 1 | 4.100 | 3.900 | 3.950 | 4.300 |
| 2 | 3.868 | 3.955 | 3.955 | 4.085 |
| Average | 4.076 | 3.834 | 3.842 | 4.307 |
| Variance | 0.016 | 0.010 | 0.012 | 0.016 |

It can be seen from Table 3 and Table 4 that varying distances lead to the increase or decrease of the antenna characteristic value β with the antenna angle fixed, but the increase or decrease is not constant and the fluctuation is not so significant. In addition, the average and variance depending on the angle in Table 4 shows that a change in the antenna characteristic value β is generally not significant with respect to a change in the distance. In other words, the antenna characteristic value β is most affected by the direction of the antenna, but is not greatly affected by the distance. Thus, by measuring and defining in advance the antenna characteristic value β, it is possible in the following operations to locate a point satisfying an antenna characteristic value β only with a signal strength, thereby tracking back its position.

The antenna characteristic value B is sensitive to the direction of an antenna but is relatively insensitive to a varying distance. Thus, operation S1-2 may be omitted.

At operation S1-3, the antenna characteristic value β is appropriately modified with the learning and reasoning functionalities of the artificial neural network.

At operation S1-1, the antenna characteristic value β is calculated based on the RSS values which are measured at the 12 points (sensor nodes) arranged at intervals of 30 degrees. However, finding the antenna characteristic over a full range of direction will require sampling at shorter intervals of angles. However, there is a physical limit to narrowing the angles. Furthermore, since the present invention is configured to perform localization of the sensor nodes N one by one from a sensor node closest to a reference position, farther sensor nodes may show more cumulative errors. Therefore, it is possible to reduce the error in the antenna characteristic value β due to the narrow angles by appropriately modifying the antenna characteristic value β using the learning and reasoning functionalities of the artificial neural network.

That is, since the antenna characteristic values β of 12 points (sensor nodes) arranged at intervals of 30 degrees are known from the aforementioned test, the angle as an input and the antenna characteristic value β at the angle as an output are used as the learning data of the artificial neural network.

In this embodiment of the invention, the antenna characteristic value β is derived over a full range of direction using an artificial neural network comprising 1 input node, 5 hidden nodes and 1 output node. The artificial neural network according to this embodiment is designed to receive an angle at the input node and to return an antenna characteristic value β at a corresponding angle at the output node. It should be noted that the respective number of the input nodes, the hidden nodes and the output nodes may vary.

The artificial neural network is an artificial intelligence mechanism which applies a mechanism by which a human brain learns and acts to engineering and social science fields to solve nonlinear problems. Since an output node of the artificial neural network has a node function such as Sigmoid like Equation 4, the output nodes always output real values of 0 to 1. At this time, one neuron multiplies n input values by the respective weights and then sums the results. The sum is subjected to an appropriate scale adjustment to be used as an input of the next node through the node function.

$$f(\text{net}) = z + \frac{1}{1 + \exp(-x \cdot \text{net} + y)} \quad \text{Equation 4}$$

(where, $x$ = input data, $y$ = output data)

In addition, the input data is input to the input node after being subject to scale transformation to have values of 0 to 1, and the input data thus needs to be subjected to pre-processing. Furthermore, normal sample data is required for an artificial neural network to learn. This embodiment uses, as sample data, the antenna characteristic value β of 12 points (sensor nodes) measured at intervals of 30 degrees in the above-mentioned test.

The learning of an artificial neural network first compares an antenna characteristic value β, which is input to the input node, with an antenna characteristic value β, which is output to the output node, and calculates the error rate. Subsequently, the effect of the weights of the input node, the hidden node and the output node on the error rate is reversely calculated. This may be easily calculated by a chain rule, and the weights are adjusted such that the error rate decreases according to the rate. This is called a back propagation process. Hereby, it is possible to configure a neural network circuit with a low error rate through the adjustment process.

Table 5 shows calculation results of the antenna characteristic value β with an artificial neural network. Table 5 shows the results of the antenna characteristic value β calculated at intervals of 10 degrees. In this embodiment, the learning is performed 400,000 times with 12 learning data and the error rate is lowered to 0.11. Although the error rate can be further reduced with increased learning, it is desirable to perform an appropriate level of learning since limited learning data may lead to overfitting. Further, the error rate or the learning time is relative and thus can be changed upon learning.

From the aforementioned test, it is possible to obtain the antenna characteristic value β over a full range of direction of the gateway and the sensor nodes.

At the first data transmission (phase 1), the first sensor node $N_1$ generates a packet that indicates the signal strength thereof and transmits data of the signal strength to the second sensor node $N_2$. The second sensor node $N_2$ compares the signal strength $TxPower_{n1}$, which has been transmitted from the first sensor node $N_1$ included in the received packet, with the signal strength $RxPower_{n2}$ of the first sensor node $N_1$, which has been actually received by the second sensor node $N_2$, and generates a data pair of $[TxPower_{n1}, RxPower_{n2}]$. The data pair is transmitted to the first sensor node $N_1$ at the second data transmission (phase 2) and is used as data for the localization of the second sensor node $N_2$. In addition, based on the data transmitted through the second data transmission (phase 2), the first sensor node $N_1$ compares the signal strength $TxPower_{n2}$, which has been transmitted from the second sensor node $N_2$, with the signal strength $RxPower_{n1}$ of the second sensor node $N_2$, which has been actually received by the first sensor node $N_1$, to obtain a data pair $[TxPower_{n2}, RxPower_n]$. The data pair $[TxPower_{n2}, RxPower_{n1}]$ is also transmitted to the second node $N_2$ at the third data transmission (phase 3) and is used as data for the localization of the first sensor node $N_1$.

TABLE 5

| Angle | | | | | | | | | |
|---|---|---|---|---|---|---|---|---|---|
| 0 | 10 | 20 | 30 | 40 | 50 | 60 | 70 | 80 | 90 |
| β 4.000 | 3.997 | 3.995 | 4.002 | 4.046 | 4.181 | 4.409 | 4.558 | 4.590 | 4.592 |

| Angle | | | | | | | | | |
|---|---|---|---|---|---|---|---|---|---|
| 100 | 110 | 120 | 130 | 140 | 150 | 160 | 170 | 180 | 190 |
| β 4.566 | 4.262 | 3.022 | 3.104 | 4.096 | 4.335 | 4.308 | 4.205 | 4.088 | 3.984 |

| Angle | | | | | | | | | |
|---|---|---|---|---|---|---|---|---|---|
| 200 | 210 | 220 | 230 | 240 | 250 | 260 | 270 | 280 | 290 |
| β 3.901 | 3.839 | 3.802 | 3.800 | 3.836 | 3.904 | 3.983 | 4.050 | 4.093 | 4.110 |

| Angle | | | | | | | | | |
|---|---|---|---|---|---|---|---|---|---|
| 300 | 310 | 320 | 330 | 340 | 350 | 360 | — | — | — |
| β 4.106 | 4.089 | 4.066 | 4.041 | 4.018 | 3.998 | 3.982 | — | — | — |

At operation S2, among a plurality of sensor nodes N located in the sensor node SF, the positions and angles of a first sensor node $N_1$ and a second sensor node $N_2$ and the distances between the first sensor node $N_1$ and the second sensor node $N_2$ are measured. All the sensor nodes N of the sensor network are effectively the same sensor node and have the same antenna and circuit configuration. For the antenna of the sensor node of the sensor network, the antenna characteristic value β was measured at operation S1 and learning was completed through the artificial neural network.

The positions and angles of the first and second sensor nodes $N_1$ and $N_2$ and the distances between the first and second sensor nodes $N_1$ and $N_2$ are actually measured after constructing the sensor network. The first and second sensor nodes $N_1$ and $N_2$ perform data communication to identify each other's positions. The data communication complies with a 3-way handshaking scheme as shown in FIG. 6.

The 3-way handshaking scheme performs data communication transmitting data three times between the first and second sensor nodes $N_1$ and $N_2$. The three data transmissions are defined a first data transmission (phase 1), a second data transmission (phase 2), and a third data transmission (phase 3), respectively.

At operation S3, the position of the third sensor node $N_3$ is measured using the positions and directions of the first and second sensor nodes $N_1$ and $N_2$ and the distance between the first and second sensor nodes $N_1$ and $N_2$ using triangulation.

FIG. 7 is a diagram of communication coverage of a sensor network according to an exemplary embodiment of the present invention. Triangles indicate first to fifth sensor nodes ($N_1$ to $N_5$) in a sensor field, and oval figures are regions where the first and second sensor nodes $N_1$ and $N_2$ can communicate. The communication coverage of the first sensor node $N_1$ is defined as a first maximum range, and the communication coverage of the second sensor node $N_2$ is defined as a second maximum range.

Referring to FIG. 7, in order to measure the position of the third sensor node $N_3$ in a region where the first and second sensor nodes $N_1$ and $N_2$ overlap, the first and second sensor nodes $N_1$ and $N_2$ attempt to communicate with the third sensor node $N_3$. Hereby, it is possible to find the transmitted signal strength and the actually received signal strength of the third sensor node $N_3$. In addition, since the antenna characteristic value β of the third sensor node $N_3$ is already known from the above-mentioned test, it is possible to find the distance between the third and first sensor nodes $N_3$ and $N_1$ from Equation 5. It should be understood that the distance between the third and second sensor nodes $N_3$ and $N_2$ can be found from Equation 5. That is, if the antenna characteristic value $\beta$ depending on the angle is applied to Equation 5, an expected position of the third sensor node $N_3$ can be found with respect to the first and second sensor nodes $N_1$ and $N_2$ as shown in FIG. 8.

$$\text{distance} = \beta \sqrt{\frac{TxPower_{n1} - RxPower_{n2}}{RxPower_{n2}}} \quad \text{Equation 5}$$

FIG. 8 shows an oval figure which is formed by drawing in a line the position of the third sensor node $N_3$ with respect to the first and second sensor nodes $N_1$ and $N_2$. The oval figure is a set of probable points of the third sensor node $N_3$ from the first and second sensor nodes $N_1$ and $N_2$. In this case, a set of probable points of the third sensor node $N_3$ from the first sensor node $N_1$ is defined a set (1, 3) and a set of probable points of the third sensor node $N_3$ from the second sensor node $N_2$ is defined a set (2, 3).

Referring to FIG. 8, the set (1, 3) and the set (2, 3) cross each other at two points. If the set (1, 3) and the set (2, 3) cross at one point, the point becomes the position of the third sensor node $N_3$. However, the set (1, 3) and the set (2, 3) mostly cross at two points or more. Therefore, which of contact points of the set (1, 3) and the set (2, 3) is the position of the third sensor node $N_3$ should be determined.

For example, if the set (1, 3) and the set (2, 3) have two contact points, i.e., a first contact point and a second contact point, a first triangle and a second triangle are imaginarily formed with respect to the first and second contact points, as shown in FIG. 9(a) and FIG. 9(b). The respective distances from the first and second sensor nodes $N_1$ and $N_2$ to the first and second contact points are calculated from Equation 5. In addition, as shown in FIG. 9(a), the opposite angle of side A is obtained using the second law of cosines. Thereafter, as shown in FIG. 9(a) and FIG. 9(b), the antenna characteristic values $\beta$ of the first and second sensor nodes $N_1$ and $N_2$ which are recognized by the first and second contact points are derived using sides $B_1$ and $C_1$ of the first triangle and sides $B_2$ and $C_2$ of the second triangle. Referring to FIG. 10, when the derived antenna characteristic $\beta$ values are $B_{n-1}$ and $B_{n-2}$, respectively, $\theta_{init}$ satisfying Equation 6 is found using angle 74 $_n$. Here, $\theta_{init}$ indicates an angle between the antenna direction of the third sensor node $N_3$ and $\beta_{n-1}$. If an angle between the antenna direction of the third sensor node $N_3$ and $\beta_{n-2}$ is less than the angle between the antenna direction of the third sensor node $N_3$ and $\beta_{n-1}$, $\theta_{init}$ indicates an angle between the antenna direction of the third sensor node $N_3$ and $\beta_{n-2}$. The values $\beta_{n-1}$ and $\beta_{n-2}$ represent expected positions of the third sensor node $N_3$ according to the respective antenna characteristic values in terms of triangulation.

$$\text{FindBetaFromAngle}(\theta_{init}) = \beta_{n-1} \quad \text{Equation 6}$$

$$\text{FindBetaFromAngle}(\theta_{init} + \theta_n) = \beta_{n-2}$$

Here, the term FindBetaFromAngle( ) is an artificial neural network module, which receives a reference angle as an input and returns a $\beta$ value at a corresponding angle. In order to find an appropriate $\theta_{init}$, the error rate is checked while increasing $\theta_{init}$ from 0 to 360 degrees. Since the value $\theta_{init}$ increases in a discrete manner, an error occurs with an actual value $\theta_{init}$. Therefore, the position and angle of the third sensor node $N_3$ are determined by providing an algorithm to select the value $\theta_{init}$ when the error rate is below a predetermined initial value and is lowest.

Table 6 shows test results of the localization of a sensor network according to an exemplary embodiment of the invention. A sensor field SF is a virtual area of 100 meters by 65 meters, and includes 60 sensor nodes N. A conventional method of sensor network localization assumes a circular radiation pattern without measuring the antenna characteristic. Further, in the conventional localization method, average position errors were only compared with sensor nodes N which succeeded in the localization. Table 6 shows 10 times of localization test results.

TABLE 6

| Number of tests | Number of nodes which failed in localization | | Average position error(m) | |
|---|---|---|---|---|
| | Present invention | Conventional technique | Present invention | Conventional technique |
| 1 | 0 | 24 | 0.8966 | 8.844 |
| 2 | 1 | 20 | 1.581 | 8.646 |
| 3 | 0 | 11 | 0.9 | 7.935 |
| 4 | 4 | 17 | 0.7321 | 8.8806 |
| 5 | 1 | 10 | 1.3932 | 6.9576 |
| 6 | 1 | 6 | 0.9898 | 8.3148 |
| 7 | 0 | 22 | 0.2766 | 7.3996 |
| 8 | 0 | 9 | 0.445 | 7.3493 |
| 9 | 1 | 19 | 0.9542 | 10.0074 |
| 10 | 0 | 11 | 0.9333 | 7.9973 |
| Average | 0.8 | 14.9 | 0.91018 | 8.23316 |

It can be seen from Table 6 that, in the conventional technique (circular pattern algorithm) where the localization is performed through the triangulation on a circular trace based on transmitted and received signal strengths, the number of sensor nodes N which failed in the localization is greater compared with the present invention. This is because the communication coverages of the first and second sensor nodes N1 and N2 for estimating the position of the third sensor node N3 do not contact each other.

On the other hand, the present invention failed in the localization only for an average of 0.8 of 60 sensor nodes. However, the failure of the localization is mostly caused by a fundamental communication failure due to isolated sensor nodes. Therefore, the method of sensor network localization with a reconstructed radiation pattern according to the present invention achieves a nearly 100% success rate for the localization when all sensor nodes are located within communication coverage. Furthermore, the present invention showed an average of a position calculation error of about 0.9 meter, while the conventional technique showed a position calculation error of about 8.2 meters.

As apparent from the above description, according to the embodiments of the present invention, the method of sensor network localization through reconstruction of a radiation pattern can minimize errors using an antenna characteristic value and a signal strength depending on orientation of the antenna.

In addition, the method according to the embodiments of the invention can minimize errors using an artificial neural network to characterize a distorted radiation pattern of an antenna and using it for the localization of a triangulation method.

Furthermore, the method according to the embodiments of the invention can increase the localization rate even in a passive localization method by characterizing an asymmetric antenna radiation pattern and constructing the antenna characteristic through an artificial neural network.

Although the present invention has been described with reference to the embodiments and the accompanying drawings, it will be understood that the embodiments are given by way of illustration and that various modifications and equivalent embodiments can be made without departing from the spirit and scope of the present invention. Accordingly, the scope of the present invention should be limited only by the accompanying claims.

What is claimed is:

1. A method of localization through reconstruction of a radiation pattern, the method comprising:

providing a sensor network that includes a plurality of sensor nodes and a gateway, wherein each of the sensor nodes and the gateway includes an antenna for communicating with each other;

measuring a radiation characteristic value of each of the antennae which depends on transmission and reception sensitivity of a selected antenna varying with the orientation of the selected antenna in the sensor network;

measuring radiation patterns of a first sensor node and a second sensor node of the plurality of sensor nodes; and measuring a position of a third sensor node based on the radiation characteristic value of an antenna corresponding to the third sensor node and the radiation patterns of the first and second sensor nodes.

2. The method according to claim 1, wherein measuring the radiation characteristic value of each of the antennae comprises:

measuring an angular radiation characteristic value at a selected angle from the gateway; and deriving the radiation characteristic value of each of the antennae over a range of angles using learning and reasoning functionalities of an artificial neural network based on the angular radiation characteristic value.

3. The method according to claim 2, wherein measuring the angular radiation characteristic value comprises:

arranging the plurality of sensor nodes in a radial pattern at a constant distance from the gateway;

comparing a signal strength transmitted from the gateway with an actual signal strength received by each of the plurality of sensor nodes; and comparing a signal strength transmitted from each of the plurality of sensor nodes with an actual signal strength received by the gateway.

4. The method according to claim 3, further comprising:

converting the signal strength transmitted from each of the plurality of sensor nodes into a sensor node transmitted signal strength in dBm;

converting the actual signal strength received by each of the plurality of sensor nodes into a sensor node received signal strength in dBm; and determining the angular radiation characteristic value β using the equation:

$$RxPower_{n2} = \frac{TxPower_{n1}}{1 + distance_{n1-n2}^{\beta}},$$

wherein $RxPower_{n2}$ indicates the second sensor node received signal strength in dBm, wherein $TxPower_{n1}$ indicates the first sensor node transmitted signal strength in dBm, and wherein $distance_{n1-n2}$ indicates a distance of the second sensor node which is calculated at the first sensor node.

5. The method according to claim 2, wherein deriving the radiation characteristic value of each of the antennae over a range of angles using learning and reasoning functionalities of an artificial neural network based on the angular radiation characteristic value comprises:

deriving the radiation characteristic value of the selected antenna over the range of angles using an artificial neural network comprising an input node, a hidden node and an output node, the artificial neural network receiving the angle of the selected antenna at the input node and returning the radiation characteristic value of the selected antenna according to the angle of the selected antenna at the output node.

6. The method according to claim 1, wherein measuring the radiation patterns of the first and second sensor nodes comprises:

measuring relative positions and angles of the first and second sensor nodes and a distance between the first and second sensor nodes;

generating a first data pair by comparing a signal strength transmitted from the first sensor node with an actual signal strength received by the second sensor node; and generating a second data pair by comparing a signal strength transmitted from the second sensor node with an actual signal strength received by the first sensor node.

7. The method according to claim 6, wherein measuring the position of the third sensor node comprises:

deriving an expected position of the third sensor node with respect to the first and second sensor nodes from the radiation characteristic value of the antenna corresponding to the third sensor node, the first data pair, and the second data pair; and determining an actual position of the third sensor node using an antenna radiation characteristic value according to the expected position of the third sensor node, an artificial neural network, and triangulation.

8. The method according to claim 7, wherein determining the actual position of the third sensor node comprises:

forming a first triangle from the first sensor node, the second sensor node, and an expected position of the third sensor node according to the first sensor node;

forming a second triangle from the first sensor node, the second sensor node, and an expected position of the third sensor node according to the second sensor node;

deriving a first antenna characteristic value of the third sensor node with respect to the first sensor node using triangulation of the first triangle and the second triangle;

deriving a second antenna characteristic value of the third sensor node with respect to the second sensor node using triangulation of the first triangle and the second triangle; and determining the actual position of the third sensor node that satisfies an artificial neural network module defined by $$FindBetaFromAngle(\theta_{init}) == \beta_{n-1}$$

$$FindBetaFromAngle(\theta_{init} + \theta_n) == \beta_{n-2},$$

wherein $\beta_{n-1}$ indicates the first antenna characteristic value of the third sensor node with respect to the first sensor node, wherein $\beta_{n-2}$ indicates the second antenna characteristic value of the third sensor node with respect to the second sensor node, wherein $\theta_n$ indicates an angle formed by (a) a side between the third sensor node and the expected position of the third sensor node according to the second sensor node and (b) a side between the third sensor node and an antenna direction of the third sensor node, and wherein $\theta_{init}$ indicates an angle formed by both (a) a side between the third sensor node and the expected position of the third sensor node according to the first sensor node and (b) the side between the third sensor node and an antenna direction of the third sensor node.

9. The method according to claim 1, wherein the third sensor node is located within a signal transmission range of the first and second sensor nodes.

* * * * *